United States Patent
Liu

(10) Patent No.: US 8,531,589 B2
(45) Date of Patent: Sep. 10, 2013

(54) IMAGE PICKUP DEVICE AND IMAGE PICKUP METHOD

(75) Inventor: Weijie Liu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 13/133,503

(22) PCT Filed: Dec. 21, 2009

(86) PCT No.: PCT/JP2009/007078
§ 371 (c)(1),
(2), (4) Date: Jun. 8, 2011

(87) PCT Pub. No.: WO2010/082277
PCT Pub. Date: Jul. 22, 2010

(65) Prior Publication Data
US 2011/0242323 A1      Oct. 6, 2011

(30) Foreign Application Priority Data

Jan. 14, 2009  (JP) .................................. 2009-005929

(51) Int. Cl.
*H04N 5/225*     (2006.01)
(52) U.S. Cl.
USPC .......................................... 348/364; 348/362
(58) Field of Classification Search
USPC ............................... 348/362, 364, 365, 229.1
See application file for complete search history.

(56) References Cited

U.S. PATENT DOCUMENTS

| 7,535,511 | B2 * | 5/2009 | Wu et al. ........................ 348/364 |
| 8,223,258 | B2 * | 7/2012 | Huang ............................ 348/364 |
| 2009/0174808 | A1 | 7/2009 | Mochida et al. |
| 2011/0304746 | A1 * | 12/2011 | Iijima et al. ................. 348/229.1 |

FOREIGN PATENT DOCUMENTS

| JP | 2002-094879 | 3/2002 |
| JP | 2005-148309 | 6/2005 |
| JP | 2008-053901 | 3/2008 |
| JP | 2009-157087 | 7/2009 |

* cited by examiner

*Primary Examiner* — Tuan Ho
(74) *Attorney, Agent, or Firm* — Greenblum & Bernstein, P.L.C.

(57) ABSTRACT

An image pickup device (100) wherein a target area, on which an exposure control is based, is accurately detected to perform the exposure control most favorably to the target. The image pickup device (100) comprises a feature detecting unit (111) that detects, based on the contour of the target, a target candidate from a picked-up image (S1); a block voting unit (112) that votes those ones of a plurality of blocks to which the target detected by the feature detecting unit (111) belong, the plurality of blocks being obtained by dividing the area of the picked-up image into the plurality of blocks; a vote compiling unit (114) that adds vote results (S3) together on a block-by-block basis over a plurality of frames, thereby compiling the vote results (S3); a significance determining unit (115) that select, based on a compilation result (S4), blocks to be used for controlling the exposure; and a control unit (116) that controls the exposure of an image pickup unit (101) based on the brightness of the blocks selected by the significance determining unit (115).

13 Claims, 11 Drawing Sheets

FRAME AT TIME POINT (t−2)

FRAME AT TIME POINT (t−3)

FRAME AT TIME POINT t

FRAME AT TIME POINT (t−4)

FRAME AT TIME POINT (t−1)

FIG.4A FRAME AT TIME POINT (t-4)

FIG.4B FRAME AT TIME POINT (t-3)

FIG.4C FRAME AT TIME POINT (t-2)

FIG.4D FRAME AT TIME POINT (t-1)

FIG.4E FRAME AT TIME POINT t

⇩ COUNTING

FIG.4F  ○=4  ▷=4  ▷=2

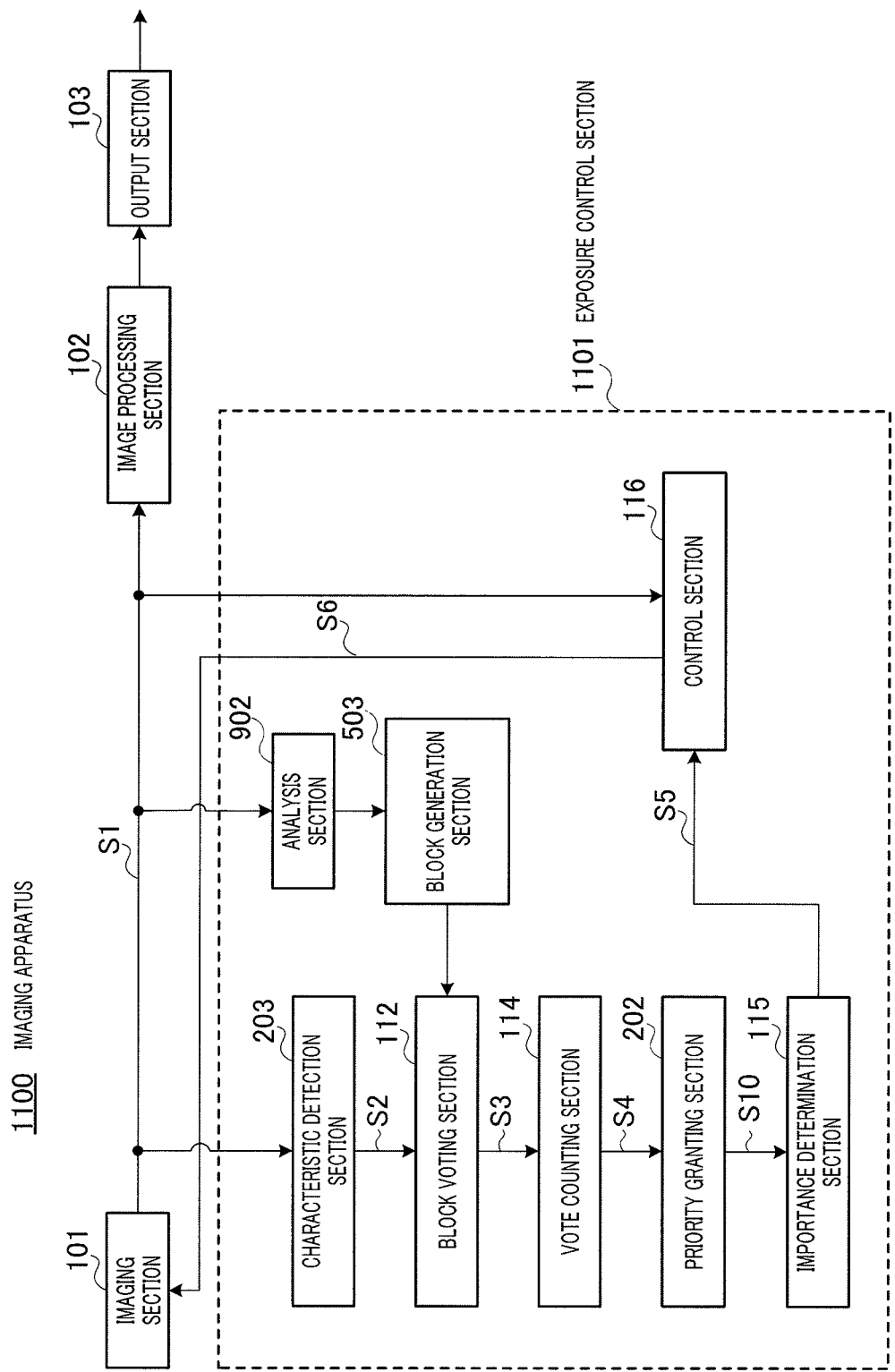

IMAGE PICKUP DEVICE AND IMAGE PICKUP METHOD

TECHNICAL FIELD

The present invention relates to an imaging apparatus and an imaging method. The present invention in particular relates to a method of controlling exposure. The present invention is suitable in use for exposure control when imaging a subject whose brightness changes significantly in the direction of time, such as a vehicle-mounted camera.

BACKGROUND ART

Conventionally, an imaging apparatus such as a digital still camera is generally provided with an automatic exposure (AE) function for adjusting the amount of exposure automatically. Exposure control is performed by measuring the amount of light in the view, and, based on the measuring result, adjusting the aperture of the lens, the electronic shutter amount, and the gain of electrical signals output from the imaging element.

To measure the amount of light, a dedicated sensor or output signals of an imaging element is used. Examples of a method of measuring the amount of light includes the full-screen average metering method by which the average brightness in the whole screen is measured, the center-weighted average metering method by which the brightness at the center part in the screen is selectively measured, the multi-zone metering method by which the screen is divided and the average brightness in each area is measured, the spot metering method by which the brightness at an arbitrary position in the screen is measured, and the multi-spot metering method by which the brightness at a plurality of arbitrary positions in the screen is measured.

In spot metering, the part that is desired to be focused on or that needs to be focused on, i.e. the part of high importance, in the screen is detected, and the average brightness in the area is measured. Examples of parts of high importance include a face, a person, and a letter. Further, as for a vehicle-mounted imaging apparatus, examples of parts of high importance include a vehicle traveling on the road, a white line, and a road sign at the roadside.

Patent Literature 1 discloses a method of controlling exposure for detecting a white line. In the case where a vehicle is traveling on the road where there are sunlight and shade alternately, hunting occurs if the timing when sunlight and shade switch does not synchronize with the timing of exposure control. To prevent hunting, Patent Literature 1 discloses a technique of providing a limit value for an increase and a limit value for a decrease with respect to the amount of change in exposure control, and limiting the amount of change in exposure control to the limit values when the amount of change exceeds these limit values.

Further, Patent Literature 2 discloses a method of controlling the resolution and exposure in an area containing an object of high importance, for example, a vehicle traveling ahead, a person, and a road sign. An area with an object of high importance is determined based on how well the shape of the object in the image matches with the memorized shape of an object, and the camera is controlled so as to set the resolution and the exposure in the area are set at predetermined values. When there are a plurality of areas with an object of high importance, a weight is applied based on the type of an object of high importance (whether it is a person, a vehicle, or a road sign) and the position thereof in the screen (whether it is inside the road or outside the road, or whether it is near or far from the subject vehicle), and determines the exposure using the average result.

CITATION LIST

Patent Literature

PTL1
Japanese Patent Application Laid-Open No. 2005-148309
PTL2
Japanese Patent Application Laid-Open No. 2008-53901

SUMMARY OF INVENTION

Technical Problem

By the way, either of the above-described conventional exposure control techniques is an exposure control method based on the area with an object of high importance, and after detecting the area with an object of high importance, exposure control is performed based on the brightness of the detected area.

Therefore, it is important to precisely detect the area with an object of high importance, which serves as a basis of exposure control.

Patent Literature 1 presumes setting a white line and a road surface area not including the white line. However, in setting a white line, there is a possibility that an error occurs or setting cannot be performed. For example, there is a possibility that the outline of a vehicle compartment of a vehicle traveling ahead is misidentified as a line in the traffic lane (a white line). Further, when highlight is blown out in the entirety of a road surface due to the backlight, there is a possibility that a white line cannot be detected. In these cases, it is difficult to use the exposure control technique according to Patent Literature 1.

According to Patent Literature 2, the area with an object of high importance is uniquely identified by the outline shape of the object of high importance. Therefore, when an object having an outline similar to the outline of an object of high importance is contained in a photographed image, there is a possibility of missing the area with an object of high importance. Specifically, exposure control for detecting a road sign will be described as an example below. When imaging a road sign using a vehicle-mounted imaging apparatus, it is common that a plurality of shapes such as triangles and circles are detected from the image. Examples of a plurality of shapes to be detected include, besides road signs, specific parts of buildings around the road and branches of trees. Therefore, there is a possibility that a building around the road or branches of a tree is misidentified for a road sign. As a result of this, incorrect exposure control might be performed where the brightness of an object other than a road sign is optimized regardless of the intention of optimizing the exposure of a road sign.

In view of the above, it is therefore an object of the present invention to provide an imaging apparatus and an imaging method for accurately detecting a target area which serves as a basis of exposure control and performing optimal exposure control for the target.

Solution to Problem

One aspect of an imaging apparatus according to the present invention employs a configuration to have an imaging section that obtains a photographed image; a detection section that detects candidates of a target from the photographed image based on an outline shape of the target; a voting section that, out of a plurality of blocks that are obtained by dividing an area of the photographed image, gives votes to blocks to which the target candidates detected by the detection section belong; a counting section that counts vote results by adding the vote results in each block over a plurality of frames; a determination section that determines importance of each block based on counting results and selects a block to use to control exposure; and a control section that calculates an exposure control parameter to use in the imaging section based on brightness of the block selected by the determination section, and controls exposure in the imaging section.

One aspect of an imaging method according to the present invention employs a configuration to have an imaging step that obtains a photographed image; a detection step that detects target candidates from the photographed image based on an outline shape of the target; a voting step that, out of a plurality of blocks that are obtained by dividing an area of the photographed image, gives votes to blocks to which the target candidates detected by the detection step belong; a counting step that counts vote results by adding the vote results in each block over a plurality of frames; a determination step that determines importance of each block based on counting results and selects a block to use to control exposure; and a control step that calculates an exposure control parameter to use in the imaging step based on brightness of the block selected by the determination step, and controls exposure in the imaging step.

Advantageous Effects of Invention

According to the present invention, by selecting a block for exposure control based on the result of voting in a plurality of frames, even when an object having an outline similar to the outline of a target is contained in one frame of a photographed image, it is possible, without misidentifying that object, to accurately detect a target area which serves as a basis of exposure control, and perform optimal exposure control for the target.

BRIEF DESCRIPTION OF DRAWINGS

FIGS. 4A to 4E explain voting to each block by a block voting section, and FIG. 4F explains counting by a vote counting section;

FIG. 11 is a block diagram showing a configuration of an imaging apparatus according to Embodiment 7.

DESCRIPTION OF EMBODIMENTS

Now, embodiments of the present invention will be described in detail with reference to the accompanying drawings. Although cases will be described with the following embodiments where the present invention is applied to road sign recognition, the scope of application of the present invention is by no means limited to road signs. The present invention is applicable in recognizing a wide range of specific objects. The present invention, however, is particularly suitable for the case where a target can be captured stably in almost the same position and the imaging conditions of other objects change over a plurality of frames (for example, 5 to 10 frames) as is the case with a road sign.

Embodiment 1

Figure 1:
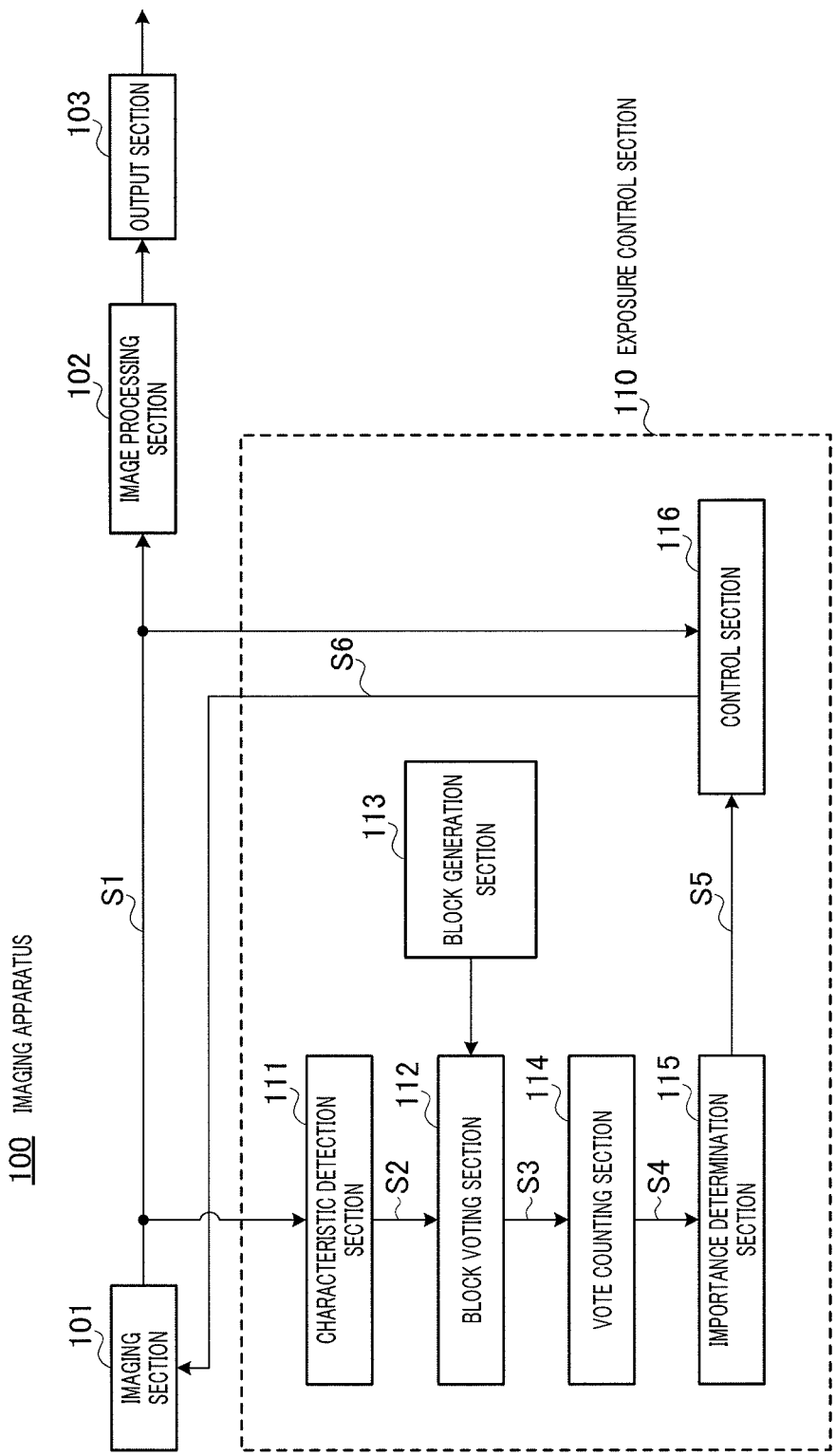
FIG. 1 shows a configuration of an imaging apparatus according to Embodiment 1 of the present invention.

FIG. 1 shows a configuration of an imaging apparatus according to Embodiment 1 of the present invention. Imaging apparatus 100 is provided mainly with imaging section 101, image processing section 102, output section 103, and exposure control section 110.

Imaging section 101 obtains an image using an imaging element such as a CCD or a CMOS. As a configuration of imaging section 101, any known configuration can be used. For example, imaging section 101 is provided with a lens, an aperture control mechanism, a shutter-speed control mechanism, and a focus control mechanism to adjust input light. Further, imaging section 101 is provided with a gain control mechanism such as an amplifier and an A/D converter to adjust the electrical characteristics of the imaging element. Further, imaging section 101 is provided with an I/F for output and a timing generator for coordination in each component. Imaging section 101 sends out photographed image S1 to image processing section 102 and exposure control section 110.

Here, imaging section 101 controls exposure by performing aperture control, shutter-speed control, and gain control. According to the present invention, however, a configuration and a method for exposure control in imaging section 101 are not limited to particular ones, and it is possible to use various configurations and methods that are suggested conventionally.

Image processing section 102 processes photographed image S1 for a specific purpose. According to the present embodiment, image processing section 102 recognizes a designated object using photographed image 51. For example, by performing pattern matching processing using a template corresponding to a pre-memorized, designated object and photographed image S1, image processing section 102 recognizes whether or not the designated object exists in photographed image S1 and where the designated object is positioned in photographed image S1. Further, image processing section 102 may perform processing of improving the image quality and processing of converting the image size, in addition to processing of recognizing a designated object. The processing result of image processing section 102 is sent out to output section 103.

Output section 103 sends out the recognition result or the image obtained in image processing section 102 to a warning apparatus or a display apparatus.

Exposure control section 110 inputs photographed image S1 to characteristic detection section 111. Characteristic detection section 111 detects target candidates from photographed image S1 based on a characteristic of the target. According to the present embodiment, target candidates are detected using an outline shape of the target as a characteristic of the target. Specifically, characteristic detection section 111 detects an object image that coincides with the outline shape of the target from photographed image S1 by performing processing such as pattern matching, and sends out positional information of the detected object image to block voting section 112 as characteristic information S2. In the case of the present embodiment, the target refers to a road sign, and the outline shape of the target refers to a triangle and a circle.

Block generation section 113 generates block information to divide an image area of photographed image S1 into a plurality of blocks, and sends out the generated block information to block voting section 112. For example, block generation section 113 generates block information to divide a VGA image having a size of 640 pixel×480 pixel into 100 blocks of images each of which having a size of 64 pixel×48 pixel.

Block voting section 112, out of a plurality of blocks generated by block generation section 113a, gives vote to the block to which the target detected by characteristic detection section 111 belongs. This voting is performed per frame.

FIG. 2 shows voting by block voting section 112 and successive counting by vote counting section 114. FIG. 2 shows a case where photographed image S1 is divided into nine blocks to make the figure simpler.

As shown in FIGS. 2A to 2E, block voting section 112 determines which block the outline shape of the target belongs to in the frame at each time point, and gives a vote to the block to which the outline shape belongs. For example, in the frame at the time point (t-4) shown in FIG. 2A, because the target having a triangular outline shape (a road sign "STOP," for example) is detected in the middle-left block and the upper-right block, block voting section 112 gives a vote to each of the middle-left block and the upper-right block in the frame at the time point (t-4). Further, for example, in the frame at the time point (t-2) shown in FIG. 2C, because the target having a triangular outline shape is detected in the middle-left block, block voting section 112 gives a vote to the middle-left block in the frame at the time point (t-2).

In this regard, when the detected outline shape straddles across a plurality of neighboring blocks, a vote may be given to the block to which the center point of the detected outline shape belongs. Further, in the same frame, when a plurality of the same outline shapes are detected in the same block (for example, when two triangles are detected in the same block), it is preferable to give only a vote to the block in the frame, without giving a plurality of votes to the block.

As described above, block voting section 112 gives a vote to the block to which the outline shape of each target belongs, per frame image. Vote result S3 of block voting section 112 for each frame is sent out to vote counting section 114.

Figure 2C:
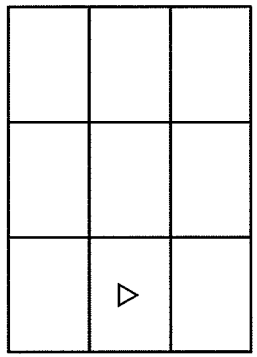
FIGS. 2A to 2E explain voting to each block by a block voting section, and FIG. 2F explains counting by a vote counting section.
Figure 2B:
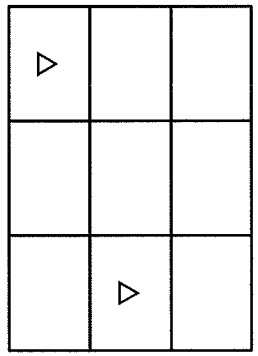
Figure 2E:
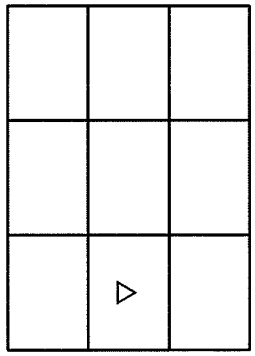
Figure 2F:
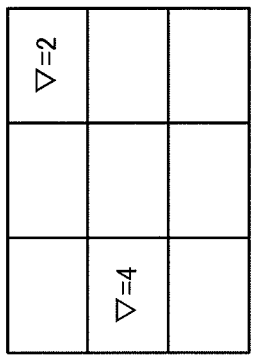
Figure 2A:
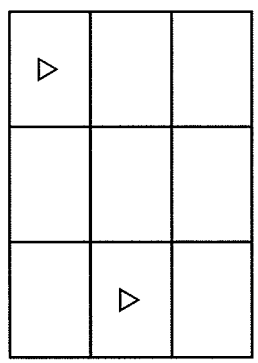
Figure 2D:
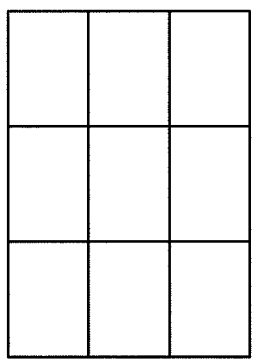

Vote counting section 114 counts the vote result by adding vote result S3 in each block over a plurality of frames. As a result of this, vote counting section 114 obtains a counting result shown in FIG. 2F. The counting result in FIG. 2F shows that, for a triangle outline, four votes are given to the middle-left block and two votes are given to the upper-right block. Vote counting section 114 sends out counting result S4 to importance determination section 115. Although a case is illustrated in FIG. 2 as an example where vote counting section 114 counts the vote result over five frames, the number of frames is not limited to five.

Importance determination section 115 determines the importance of each block based on counting result S4. Specifically, importance determination section 115 determines the block obtaining the largest number of votes (the middle-left block in the case of FIG. 2F) as the most important block, and sends out determination result S5 to control section 116.

Here, when there are a plurality of blocks obtaining the largest number of votes, it is preferable to determine the most important block as described below.

Determining a block obtaining larger number of votes in the recent frame over time as a more important block.

Determining a block in a more important spatial position as a more important block. For example, when a vehicle travels on the left side and the target is a road sign, because road signs are likely to be positioned at the left side or the upper side in an imaging display, it is preferable to set the block at the left side or the upper side in the imaging display as the important block.

Control section 116 controls exposure in imaging section 101 by using the block that is determined as the most important block by importance determination section 115 as the block for exposure control. Specifically, control section 116 controls exposure in imaging section 101 by inputting photographed images S1 from imaging section 101, detecting the brightness of the most important block out of photographed images S1, calculating camera control parameter S6 such that the average brightness of the most important block is within the predetermined range of brightness, and sending out camera control parameter S6 to imaging section 101.

As described above, according to the present embodiment, by providing characteristic detection section 111 that detects target candidates from photographed image S1 based on the outline shape of the target, block voting section 112 that, out of a plurality of blocks that are obtained by dividing a photographed image area, gives a vote to the block to which the target detected by characteristic detection section 111 belongs, vote counting section 114 that counts vote result S3 by adding vote results S3 in each block over a plurality of frames, importance determination section 115 that selects a block to use to control exposure based on counting result S4, and control section 116 that controls exposure in imaging section 101 based on the brightness of the block selected by importance determination section 115, even when an object having an outline similar to the outline shape of the target is contained in one frame of a photographed image, it is possible, without misidentifying that object, to accurately detect a target area which serves as a basis of exposure control, and perform optimal exposure control for the target.

As a result of this, image processing section 102 can perform recognition processing using a photographed image in which the brightness of a target is optimized, improving the recognition accuracy.

Here, a reason will be described below why the present embodiment is highly effective in traffic sign recognition.

(1) Because road signs are mounted such that the display surface faces in the direction of a traveling vehicle, road signs have a uniform reflectivity, compared to other objects to be imaged such as buildings and trees. That is, for road signs, because changes in reflectivity are small even when a vehicle changes the traveling direction and traveling position over time, road signs are likely to be detected stably, compared to other objects such as buildings and trees. That is, traffic signs are robust against changes in a relative direction and the position with respect to imaging apparatus 100. On the other hand, because the reflectivity of imaging areas such as specific parts of buildings and branches of trees near the road varies per pixel, such imaging areas are unlikely to be detected when the vehicle-mounted imaging apparatus moves and the relative direction changes.

(2) Because located in a predetermined position such as at the side or the upper side on the road, road signs are located in almost fixed position in a photographed image, even when a vehicle changes the traveling direction and the traveling position over time, if it is short in time. Therefore, votes tend to concentrate on a certain block, so voting and counting according to the present embodiment are effective. Further, as described above, it is possible to select an optimal block for exposure control, taking the importance of spatial position into account.

Embodiment 2

A case has been described with Embodiment 1 where a block having the outline shape of the target is determined by voting, and the block obtaining the largest number of votes is selected as the block for exposure control. A case will be described with the present embodiment where, in addition to the above configuration, a block for exposure control is selected taking into account the priority corresponding to the type of the outline shape and the pattern in the outline.

Specifically, the following priority is granted.

(1) Priority granted according to the type of the outline shape: For example, the priority of a road sign having a triangular outline shape is set higher than the priority of a road sign having a circular outline shape.

(2) Priority granted according to the pattern in the outline: For example, when outline shapes are the same triangles, the priority of a road sign "STOP" is set higher than the priority of a road sign "GO SLOW." Further, when outline shapes are the same circles, the priority of the speed limit sign is set higher than the priority of the no-parking sign.

(3) Priority granted according to both the type of the outline shape and the pattern in the outline: For example, when a road sign having a triangular outline shape and a pattern in an outline of "STOP" and a road sign having a circular outline shape and a pattern in an outline of "SPEED LIMIT" are detected, the priority is granted in order of "STOP">"SPEED LIMIT">triangle>circle. That is, in determining the importance actually, because sometimes the outline shape alone is not sufficient, with the present embodiment, the pattern in the outline is added as an element of priority, in addition to the type of the outline shape.

However, as for an image before exposure control, there is a possibility that a pattern in the outline cannot be detected, the priority of a pattern in the outline may not be granted.

Figure 3:
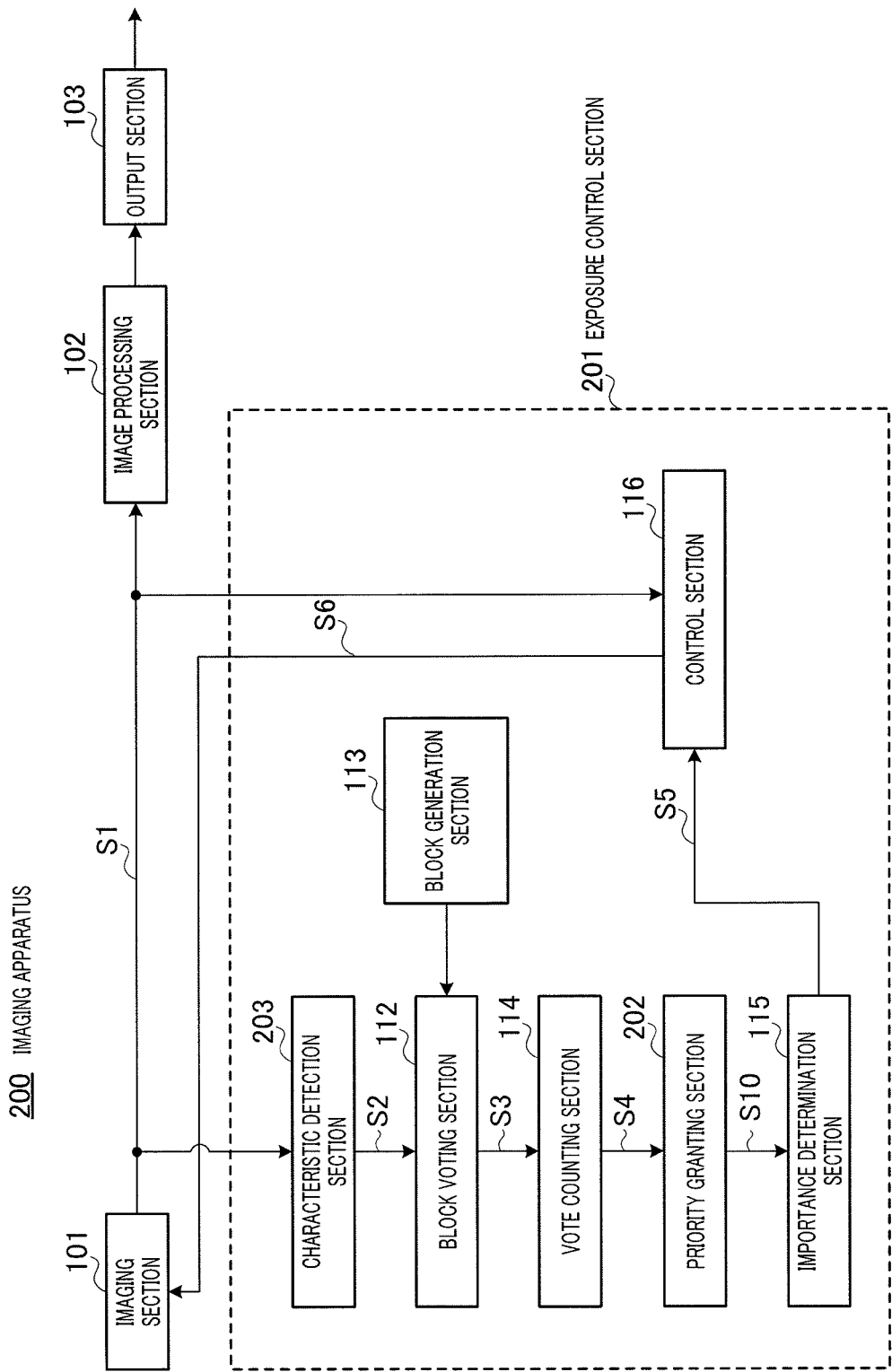
FIG. 3 is a block diagram showing a configuration of an imaging apparatus according to Embodiment 2.

FIG. 3 shows a configuration of an imaging apparatus according to the present embodiment, in which the same reference numerals as in FIG. 1 are used for the parts that are the same as in FIG. 1. Exposure control section 201 of imaging apparatus 200 is provided with priority granting section 202. Further, characteristic detection section 203 according to the present embodiment detects the outline shape and the pattern in the outline as a characteristic of the target. Therefore, characteristic detection section 203 outputs information about the type and the position of the detected outline shape and the type and the position of the pattern in the outline, as characteristic information S2.

Block voting section 112 gives a vote to a block per type of the detected outline shape and per type of the detected pattern in the outline. Vote counting section 114 counts the number of votes for each block per type of the outline shape and per type of the detected pattern in the outline.

Priority granting section 202 grants the priority corresponding to the type of the outline shape and the type of the pattern in the outline to obtained vote (counting) result S4. Specifically, priority granting section 202 may apply a weight to obtained vote result S4 by multiplying a coefficient of a greater value to the type of the outline shape and the pattern in the outline having a higher priority. For example, when granting the priority in order of "STOP">"SPEED LIMIT">triangle>circle, priority granting section 202 may multiply the number of votes for "STOP" by a multiplication factor of 2, multiply the number of votes for "SPEED LIMIT" by a multiplication factor of 1.5, multiply the number of votes for a triangle by a multiplication factor of 1, and multiply the number of votes for a circle by a multiplication factor of 0.5. Further, the method of granting priority is not limited to this. For example, it is possible to increase the number of votes at a time for a higher priority in block voting section 112.

New obtained vote (counting) result S10 which is granted priority as described above is transmitted to importance determination section 115, and the block obtaining the largest number of votes is selected as the block for exposure control by importance determination section 115, as is in Embodiment 1.

FIG. 4 shows a simple example of an operation when the present embodiment is used. FIG. 4 shows a vote result and an obtained vote result for a sign having a triangular outline shape and a sign having a circular outline shape. Assume that voting is performed for each frame as shown in FIGS. 4A to 4E, and the obtained vote result is shown in FIG. 4F.

As is clear from the obtained vote result in FIG. 4F, the same number of votes is obtained in the upper-left block and the middle-left block. With the present embodiment, however, because the priority of a triangle is set higher than the priority of a circle, the middle-left block is selected as the block for exposure control.

According to the present embodiment, in addition to the configuration of Embodiment 1, by granting the priority corresponding to the outline shape of the target or the pattern in the outline of the target, in addition to the effects of Embodiment 1, it is possible to increase the probability of using a target having higher importance as a block for exposure control.

Embodiment 3

A preferable method of selecting a block for exposure control will be described here with the present embodiment in the case where importance determination section 115 determines that there are a plurality of blocks having the same importance according to the methods presented in Embodiments 1 and 2.

Both in the daytime and at the nighttime, it is common that a target candidate in which shadow is blocked up and a target candidate in which highlight is blown out exist in the same frame at the same time depending on the reflecting property of each part and how a light is shined on each part in the image area. For either target, it is possible to detect the outline shape, but it is difficult to confirm the type of the pattern in the outline. As a result of that, there is a possibility that importance determination section 115 determines that there are a plurality of blocks having the same importance.

With the present embodiment, which is explained specifically using FIG. 3, priority granting section 202 and importance determination section 115 perform an operation that is different from the operation described in Embodiment 2.

Importance determination section 115 first performs the operation described in Embodiment 2, and if there are two or more blocks having the same importance, calculates the average brightness of each of such blocks and the average brightness of the whole frame, and compares them. For easier explanation, a case will be described here where there are two blocks having the same importance (the number of votes), that is, block 1 and block 2. Further, suppose that there is a relationship where the average brightness of block 1 is higher than the average brightness of block 2. In that case, the following three cases are obtained.

(1) Average brightness of block 1>average brightness of block 2>average brightness of a frame: In this case, block 2 is selected as the important block, taking into account the fact that a target candidate is likely to be detected when the target candidate is brighter than the whole screen. By this means, because block 1 is maintained to be in a comparatively bright state even when exposure is controlled based on the brightness of block 2, it is possible to increase the possibility that block 1 can keep being detected. Here, if exposure is controlled based on the brightness of block 1, exposure will be lowered a lot, decreasing the brightness of block 2 and consequently increasing the possibility that block 2 cannot be detected.

(2) Average brightness of a frame>average brightness of block 1>average brightness of block 2: In this case, block 1 is selected as an important block, taking into account the fact that a target candidate is likely to be detected when the target candidate is darker than the whole screen. By this means, because block 2 is maintained to be in a comparatively darker state even when exposure is controlled based on the brightness of block 1, it is possible to increase the possibility that block 2 can keep being detected. Here, if exposure is controlled based on the brightness of block 2, exposure will be increased a lot, increasing the brightness of block 1 and consequently increasing the possibility that block 1 cannot be detected.

(3) Average brightness of block 1>average brightness of a frame>average brightness of block 2: In this case, first, the average brightness of the frame is compared with a predetermined brightness (for example, a predetermined brightness value is set at 100 when a range of brightness is from 0 to 255), and when the average brightness of the frame is higher than the predetermined brightness value, block 1 is determined as an important block. If not, block 2 is determined as an important block. The reason is that a dark target candidate detected when the whole screen is bright is considered to be likely in a backlight environment. Even when exposure is controlled based on a bright target candidate, the possibility that a dark target candidate can keep being detected is high. In contrast, when exposure is controlled based on a dark target candidate, the possibility that a bright target candidate will not be detected is high. Further, the possibility is considered to be high that a bright target candidate detected when the whole screen is dark is in the environment to be illuminated by a light, for example. Even when exposure is controlled based on a dark target candidate, the possibility is high that a bright target candidate will can keep being detected.

As described above, according to the present embodiment, when determining that there are a plurality of blocks having the same importance, importance determination section 115 selects either block as a block to use to control exposure, out of the plurality of blocks, based on the relationship between the average brightness of each block of the plurality of blocks and the average brightness of the frame.

Although a case has been described above where it is determined that there are two blocks having the same importance, it is also possible to apply the same concept as described above to the case where it is determined that there are three or more blocks having the same importance. In short, by selecting a block having the average brightness that is the closest to the average brightness of the frame, out of a plurality of blocks having the same importance, it is possible to keep detecting the remaining blocks.

According to the present embodiment, control section 116 controls exposure in imaging section 101 based on the brightness of the block selected by importance determination section 115 as described above. Then, importance determination section 115 excludes the previously-selected block, and selects a new block to use for exposure control based on a new counting result. Then, control section 116 controls exposure in imaging section 101 based on the brightness of the new block selected by importance determination section 115. Regarding the specific method of excluding the previously-selected block, for example, priority granting section 202 may give a minus vote to the block previously selected by priority granting section 202. That is, for a block for which the type of the pattern in the outline is confirmed, the importance of the block is lowered by a predetermined value at the time point when the confirmation result is obtained.

By this means, it is possible to confirm the pattern in the outline sequentially for all of a plurality of blocks having the same importance without exception.

Further, the above-described average brightness of a block may be the average brightness of the whole block or the average brightness of the target candidate that belongs to the block. That is, it is acceptable as long as it is the average brightness within a block. Further, the average brightness of a frame may be the average brightness of a whole screen or the average brightness of related blocks and the average brightness of neighboring blocks.

Embodiment 4

Figure 5:
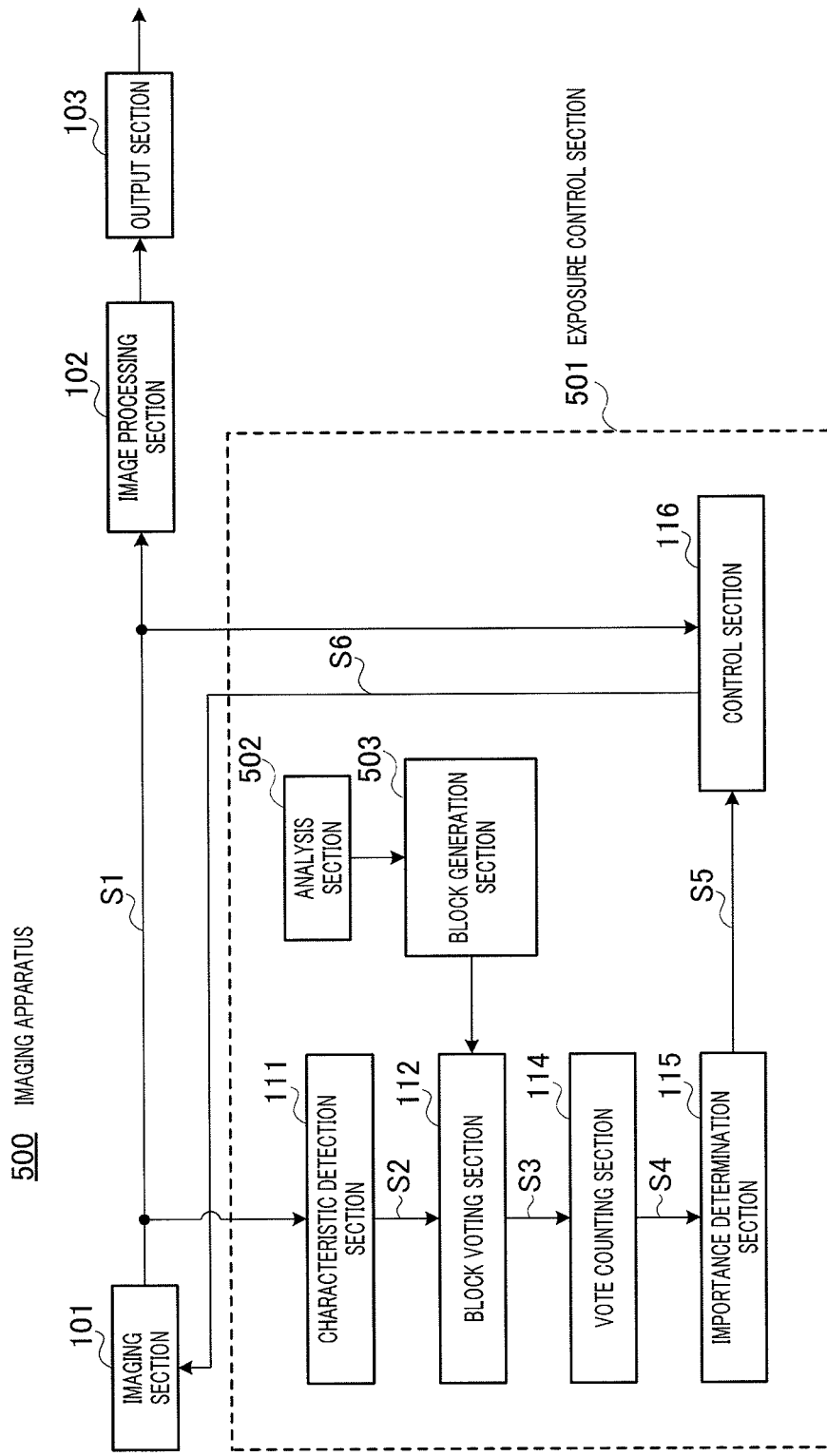
FIG. 5 is a block diagram showing a configuration of an imaging apparatus according to Embodiment 4.

FIG. 5 shows a configuration of imaging apparatus 500 according to Embodiment 4. Imaging apparatus 500 differs from imaging apparatus 100 of Embodiment 1 in the configuration of exposure control section 501. Exposure control section 501 comprises block generation section 503 that is configured differently from block generation section 113 (FIG. 1), and analysis section 502.

Imaging apparatus 500 according to Embodiment 4 of the present invention will be described below. In FIG. 5, parts that are the same as in FIG. 1 will be assigned the same reference numerals as in FIG. 1.

Analysis section 502 analyzes the traveling condition of a vehicle on which imaging apparatus 500 is mounted. Analysis section 502 analyzes, for example, the condition where a vehicle is making a curve turn, the condition where a vehicle is traveling downhill, and the condition where a vehicle is accelerating. Analysis section 502 outputs analysis information showing an analysis result of vehicle's traveling condition to block generation section 503.

Figure 6:
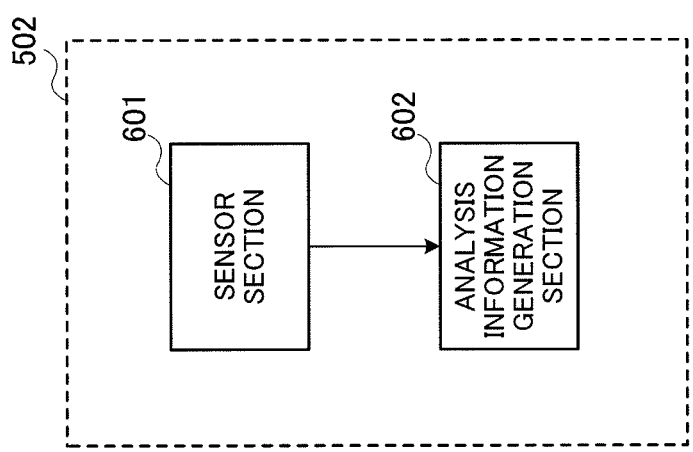
FIG. 6 is a block diagram showing a configuration of an analysis section.

FIG. 6 shows an example of a configuration of analysis section 502. Analysis section 502 is provided with sensor section 601 and analysis information generation section 602. Sensor section 601 is an acceleration sensor and a yaw rate sensor, for example. Sensor section 601 senses, for example, the condition where a vehicle is making a curve turn, the condition where a vehicle is traveling downhill, and the condition where a vehicle is accelerating, and reports to analysis information generation section 602. Upon receiving the report, analysis information generation section 602 generates and outputs analysis information.

Further, more preferably, analysis information includes information about the degree of a curve and acceleration, besides the information about the condition where a vehicle is making a curve turn, the condition where a vehicle is traveling downhill, and the condition where a vehicle is accelerating.

Figure 7:
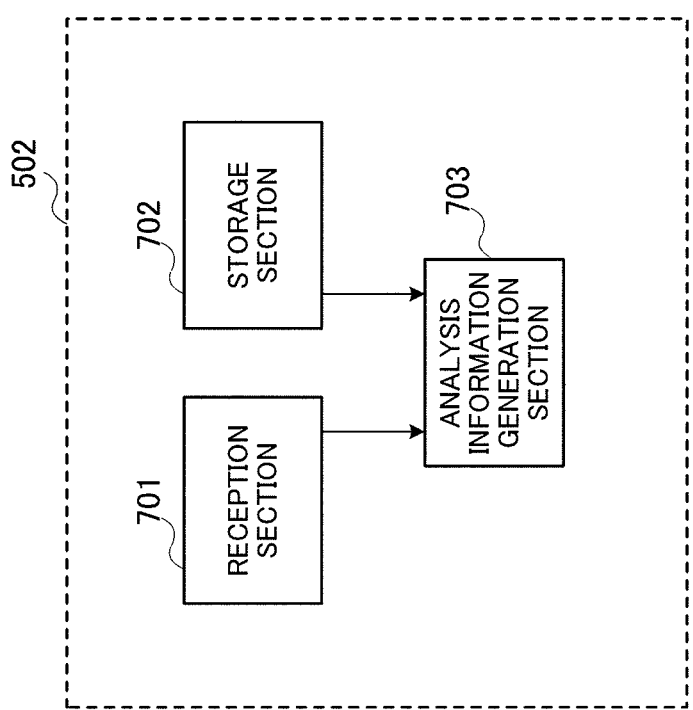
FIG. 7 is a block diagram showing a configuration of an analysis section.

FIG. 7 shows yet another example of a configuration of analysis section 502. Analysis section 502 is provided with global positioning system (GPS) reception section 701, storage section 702 that stores map information, and analysis information generation section 703. GPS reception section 701 obtains the position of a vehicle and outputs positional information to analysis information generation section 703. Storage section 702 outputs map information to analysis information generation section 703. Analysis information generation section 703 analyzes a vehicle's traveling condition based on the positional information and the map information, and generates and outputs analysis information. That is, the analysis information includes positional information of a vehicle in a map.

Further, FIGS. 6 and 7 shows merely examples of a configuration of the analysis section, and the analysis section may be any configuration as long as the analysis section has a function of analyzing a vehicle's traveling condition.

Block generation section 503 inputs the analysis information from analysis section 502. Block generation section 503 generates block information based on the analysis information. That is, block generation section 503 generates block information based on the vehicle's traveling condition. For example, block generation section 503 changes block information depending on whether a vehicle is in the condition of making a right curve turn or a vehicle is in the condition of making a left curve turn, and outputs the block information to block voting section 112.

FIG. 8 shows photographed images each of which is split into a plurality of blocks using block information generated by block generation section 503 based on the analysis information. Block generation section 503 will be described below using FIG. 8.

Figure 8C:
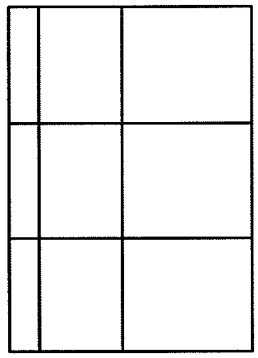
FIGS. 8A to 8F explain blocks generated by a block generation section.
Figure 8F:
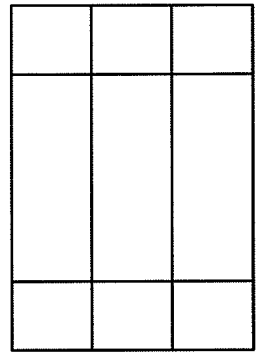
Figure 8B:
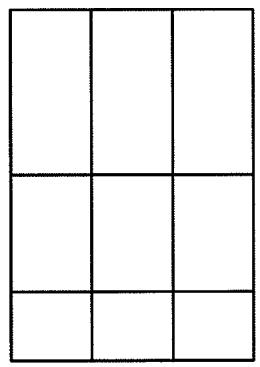
Figure 8E:
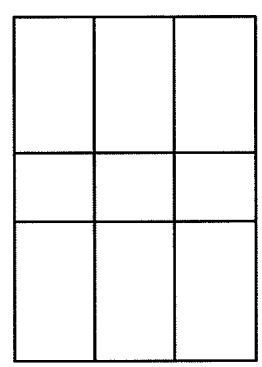
Figure 8A:
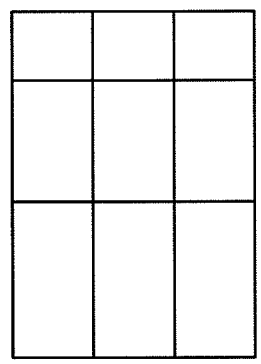

FIG. 8A shows a photographed image when analysis information indicates that a vehicle is making a right curve turn. When a vehicle is making a right curve turn, changes are greater in the left part of an image than in the right part of the image in the photographed image. Therefore, blocks in the left part are made larger than blocks in the right part. As described above, according to the present embodiment, a block is made larger for the area in which an image changes greater.

The reason of doing this will be described below in short. As changes in an image are greater, the accuracy of detection by characteristic detection section 111 is lowered, and even when the target exists in the image, the possibility of detecting the target decreases. As a result of this, inconvenience arises that the number of votes by block voting section 112 lowers in an area in which an image changes greater. Therefore, according to the present embodiment, by making a block larger for an area in which an image changes greater, it is possible to increase the number of votes to be given to the area in which the image changes greater. That is, by making a block larger, it is possible to compensate for decrease in the probability of detection. By this means, it is possible to resolve an imbalance in voting to each block caused by the difference in the amount of change in an image, and realize fair voting.

FIG. 8B shows a photographed image when analysis information indicates that a vehicle is making a left curve turn. The principle is the same as described for FIG. 8A.

FIG. 8C shows a photographed image when analysis information indicates that a vehicle is traveling uphill. When a vehicle is traveling uphill, changes are greater in the lower part of an image than in the upper part of the image in the photographed image. Therefore, blocks in the lower part are made larger than blocks in the upper part in the photographed image.

Figure 8D:
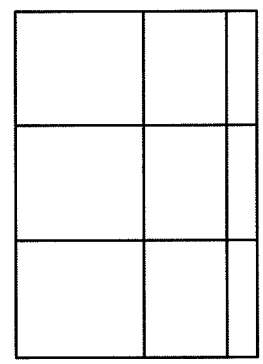

FIG. 8D shows a photographed image when analysis information indicates that a vehicle is traveling downhill. The principle is the same as described for FIG. 8C.

Block generation section 503 generates information about a block division shown in FIGS. 8E and 8F depending on other condition of the speed or acceleration of a vehicle.

FIG. 8E shows a block division when analysis information indicates that the speed or acceleration of a vehicle is equal to or greater than a predetermined threshold value. FIG. 8F shows a block division when analysis information indicates that the speed or acceleration of a vehicle is smaller than a predetermined threshold value. When the speed or acceleration of a vehicle is greater, changes are greater at left and right sides of an image than at the center of the image in the photographed image. Therefore, when the speed or acceleration of a vehicle is greater, blocks at left and right sides are made larger than the blocks at the center in the photographed image.

Further, an operation of block voting section 112 is the same as described in Embodiment 1, and therefore explanations will be omitted. Further, other operations are the same as described in Embodiment 1, and therefore explanations will be omitted.

According to the above configuration, by analyzing vehicle's traveling condition and changing the size of blocks based on analysis information, it is possible to resolve an imbalance in voting accompanying the traveling condition and accurately detect the target area which serves as a basis of exposure control.

Embodiment 5

Figure 9:
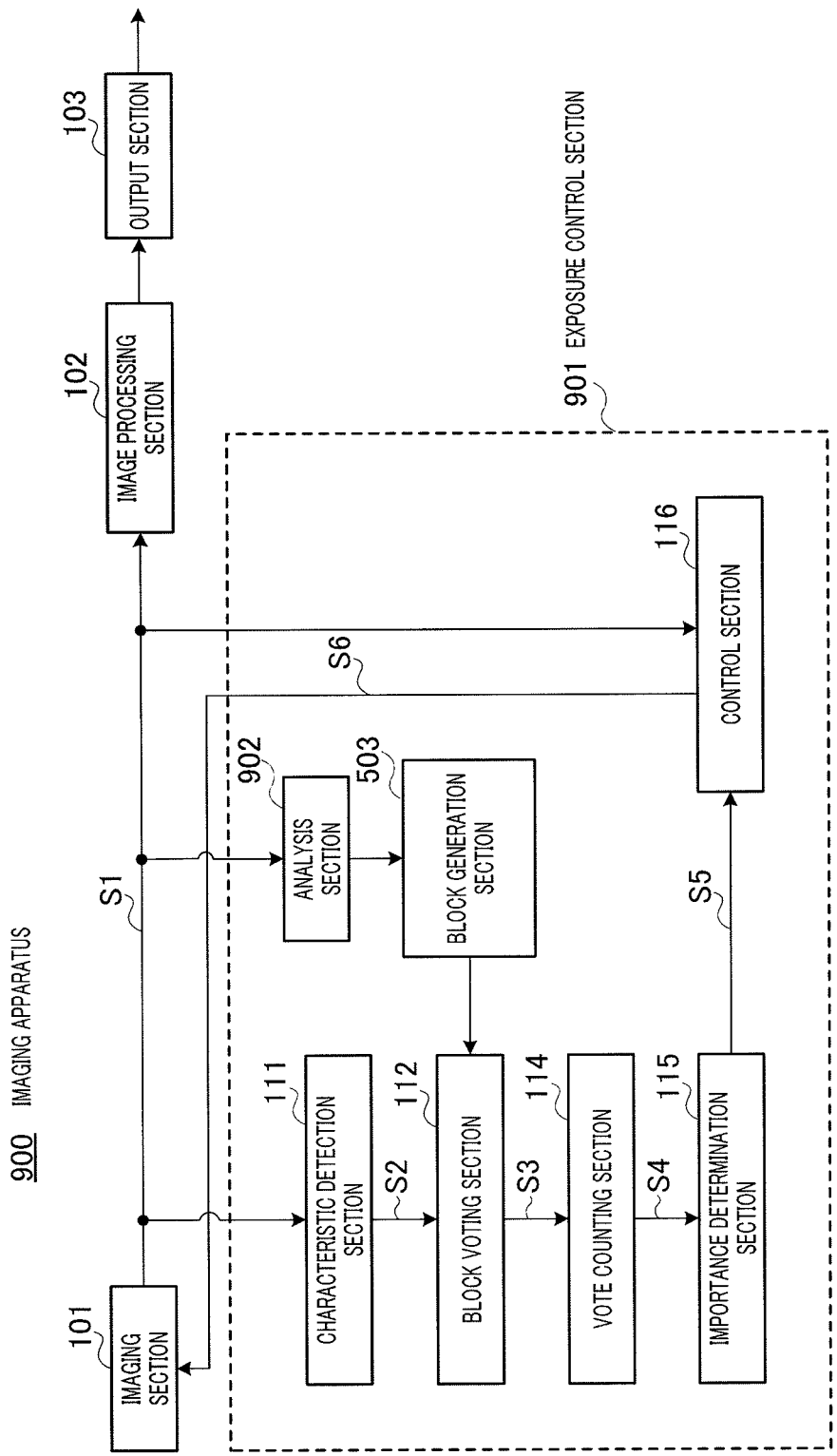
FIG. 9 is a block diagram showing a configuration of an imaging apparatus according to Embodiment 5.

FIG. 9 shows a configuration of imaging apparatus 900 according to Embodiment 5. Imaging apparatus 900 differs from Embodiment 5 in that analysis section 902 of exposure control section 901 outputs photographed image S1 in imaging section 101.

Imaging apparatus 900 according to Embodiment 5 of the present invention will be described below. In FIG. 9, parts that are the same as in FIG. 5 will be assigned the same reference numerals as in FIG. 5.

Analysis section 902 receives as input an image obtained by imaging section 101 and performs an image analysis. Analysis section 902 analyzes the traveling condition of a vehicle on which imaging apparatus 900 is mounted by performing an image analysis. Analysis section 902 analyzes, for example, the condition where a vehicle is making a curve turn, the condition where a vehicle is traveling downhill, and the condition where a vehicle is accelerating. That is, analysis section 902 performs the same analysis as in analysis section 502 of Embodiment 4 using a photographed image. As a result of analyzing vehicle's traveling condition, analysis section 902 outputs analysis information to block generation section 503.

Functions of block generation section 503 are the same as described in Embodiment 4, and therefore explanations will be omitted.

According to the above-described configuration, as is the case with Embodiment 4, by analyzing vehicle's traveling condition and changing the size of blocks based on analysis information, it is possible to resolve an imbalance in voting accompanying the traveling condition and accurately detect a target area which serves as a basis of exposure control.

Embodiment 6

Figure 10:
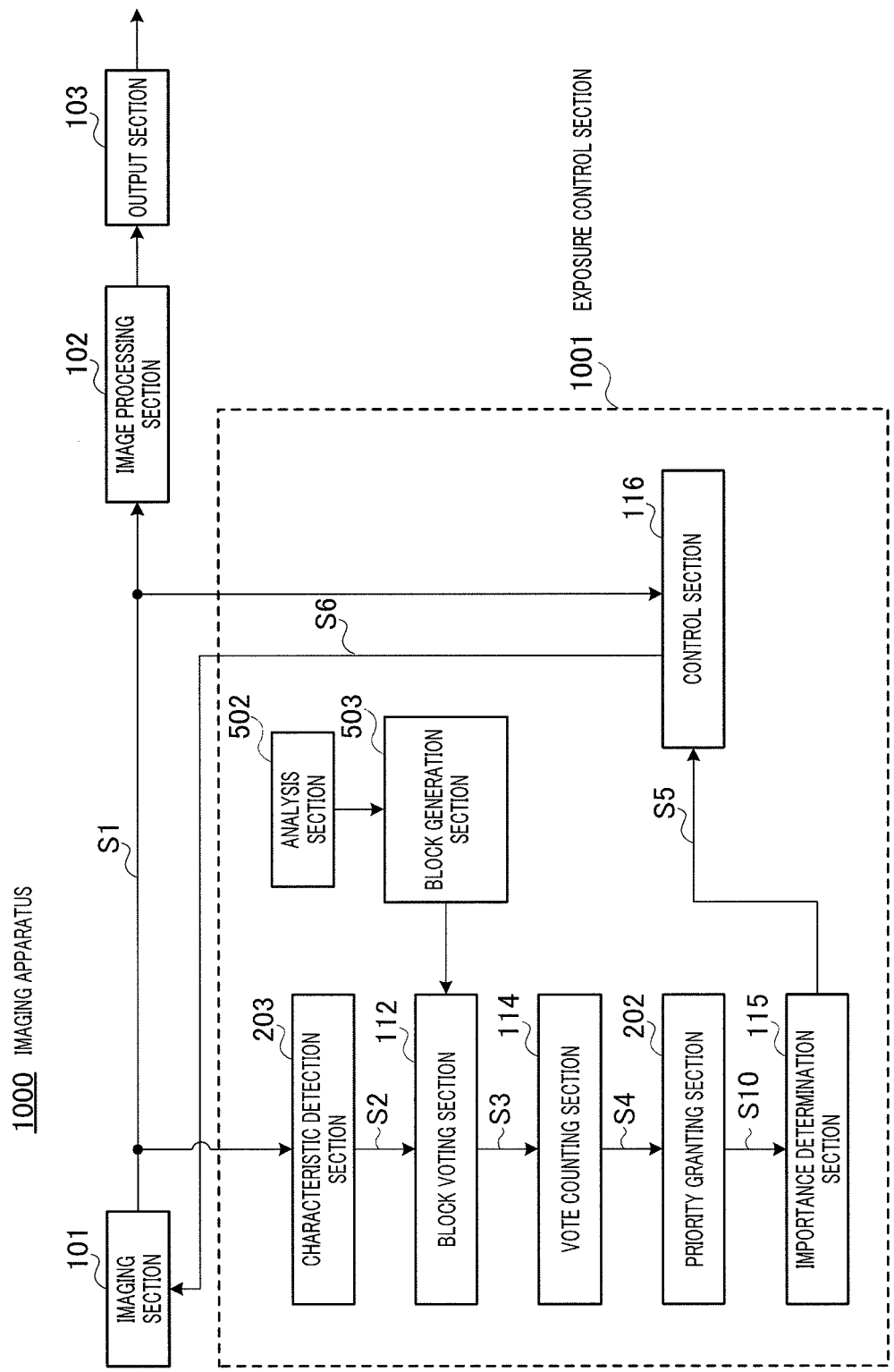
FIG. 10 is a block diagram showing a configuration of an imaging apparatus according to Embodiment 6.

FIG. 10 shows a configuration of imaging apparatus 1000 according to Embodiment 6. Imaging apparatus 1000 is provided with a configuration, in which importance determination section 115 described in Embodiment 2 and analysis section 502 described in Embodiment 4, are added to the configuration according to Embodiment 1 (FIG. 1).

According to the configuration in FIG. 10, in addition to the effects of Embodiment 1, it is possible to achieve the effect of increasing the probability of using the target having higher importance as a block for exposure control (the effect of Embodiment 2) and the effect of resolving an imbalance in voting accompanying the traveling condition and accurately detecting the target area which serves as a basis of exposure control (the effect of Embodiment 4).

Embodiment 7

FIG. 11 shows imaging apparatus 1100 according to Embodiment 7. Imaging apparatus 1100 differs from Embodiment 6 in that analysis section 902 of exposure control section 1101 inputs photographed image S1 in imaging section 101. Functions of analysis section 902 are the same as described in Embodiment 5, and therefore explanations will be omitted.

According to the configuration in FIG. 11, it is possible to achieve the same effects as for the configuration in FIG. 10.

The disclosure of Japanese Patent Application No. 2009-005929, filed on Jan. 14, 2009, including the specification, drawings and abstract, is incorporated herein by reference in its entirety.

INDUSTRIAL APPLICABILITY

The present invention has effects of accurately detecting a target area which serves as a basis of exposure control and performing optimal exposure control for the target, and is suitable in use for a vehicle-mounted imaging apparatus that recognizes road signs, for example.

The invention claimed is:

1. An imaging apparatus comprising:
an imaging section that obtains a photographed image;
a detection section that detects candidates of a target from the photographed image based on an outline shape of the target;
a voting section that, out of a plurality of blocks that are obtained by dividing an area of the photographed image, gives votes to blocks to which the target candidates detected by the detection section belong;
a counting section that counts vote results by adding the vote results in each block over a plurality of frames;
a determination section that determines importance of each block based on counting results and selects a block to use to control exposure; and
a control section that calculates an exposure control parameter to use in the imaging section based on brightness of the block selected by the determination section, and controls exposure in the imaging section.

2. The imaging apparatus according to claim 1, further comprising a priority granting section that grants priorities to the detected target candidates according to the type of the outline shape of the target, wherein the determination section determines the importance of each block based on the counting results and the priorities.

3. The imaging apparatus according to claim 1, wherein:
the imaging apparatus is mounted in a vehicle; and
the imaging apparatus further comprises:
an analysis section that analyzes a traveling condition of the vehicle; and
a block generation section that generates a plurality of blocks by changing the size of blocks based on an analysis result in the analysis section.

4. The imaging apparatus according to claim 1, wherein a block generation section that generates the plurality of blocks by changing the size of blocks based on a significance of changes in the photographed image over time.

5. The imaging apparatus according to claim 1, wherein:
the detection section detects the target candidates based on a pattern in the outline of the target in addition to the outline shape of the target;
the imaging apparatus further comprises a priority granting section that grants priorities to the detected target candidates according to the type of the outline shape and the type of the pattern in the outline of the target; and
the determination section determines the importance of each block based on the counting results and the priorities.

6. The imaging apparatus according to claim 1, wherein, when determining that there are a first block and a second block having the same importance, the determination section selects one of the first and second blocks as a block to use to control exposure based on a relationship between average brightness in each block of the first and second blocks and average brightness of the frame.

7. The imaging apparatus according to claim 6, wherein, when the relationship of the average brightness in the first block>the average brightness in the second block>the average brightness of the frame holds, the determination section selects the second block as the block to use to control exposure.

8. The imaging apparatus according to claim 6, wherein, when the relationship of the average brightness in the frame>the average brightness in the first block>average brightness in the second block holds, the determination section selects the first block as the block to use to control exposure.

9. The imaging apparatus according to claim 6, wherein, when the relationship of average brightness in the first block>average brightness of the frame>average brightness in the second block holds, the determination section selects the first block as the block to use to control exposure if the average brightness in the frame is higher than a predetermined value, or selects the second block as the block to use to control exposure if the average brightness in the frame is equal to or lower than the predetermined value.

10. The imaging apparatus according to claim 6, wherein:
the control section controls exposure in the imaging section based on the brightness of the one of the first and second blocks that is selected by the determination section;
then, the determination section excludes the first or second block selected previously, and selects a new block to use to control exposure based on a new counting result; and
then, the control section controls exposure in the imaging section based on brightness of the new block selected by the determination section.

11. The imaging apparatus according to claim 1, wherein the target is a road sign.

12. The imaging apparatus according to claim 1, further comprising an image processing section that recognizes the target using a photographed image after exposure control by the control section.

13. An imaging method comprising:
an imaging step that obtains a photographed image;
a detection step that detects target candidates from the photographed image based on an outline shape of the target;
a voting step that, out of a plurality of blocks that are obtained by dividing an area of the photographed image, gives votes to blocks to which the target candidates detected by the detection step belong;
a counting step that counts vote results by adding the vote results in each block over a plurality of frames;
a determination step that determines importance of each block based on counting results and selects a block to use to control exposure; and
a control step that calculates an exposure control parameter to use in the imaging step based on brightness of the block selected by the determination step, and controls exposure in the imaging step.

* * * * *